United States Patent

[11] 3,598,421

| [72] | Inventor | Wylie A. Mason, Jr. |
| | | Thousand Oaks, Calif. |
| [21] | Appl. No. | 745,553 |
| [22] | Filed | July 17, 1968 |
| [45] | Patented | Aug. 10, 1971 |
| [73] | Assignee | Wells Industries Corporation |
| | | North Hollywood, Calif. |

[54] PLATFORM TRAILER
6 Claims, 9 Drawing Figs.

| [52] | U.S. Cl. | 280/106 |
| [51] | Int. Cl. | B62d 21/02 |
| [50] | Field of Search | 280/106 |

[56] References Cited
UNITED STATES PATENTS

| 2,507,845 | 5/1950 | Ziegler | 280/106 T |
| 2,853,309 | 9/1958 | Hubbard | 280/106 T |
| 2,915,320 | 12/1959 | Jewell | 280/106 T |
| 2,841,415 | 7/1958 | Black | 280/106 T |
| 2,926,928 | 3/1960 | Bennett | 280/106 T |

*Primary Examiner*—Philip Goodman
*Attorney*—Robert E. Geauque

ABSTRACT: The present disclosure pertains to a platform trailer having a plurality of crossbeams and torque tubes adjoined between a pair of elongated side rails so as to provide a load path between parallel hard points on each side of the trailer thereby, absorbing the bending and torsional loads acting thereon. The trailer also has a kingpin supported by a plurality of bars to distribute any inertial loads acting on the kingpin over a wide area.

PATENTED AUG 10 1971

WYLIE A. MASON, JR.
INVENTOR.

BY R. E. Beauger
ATTORNEY

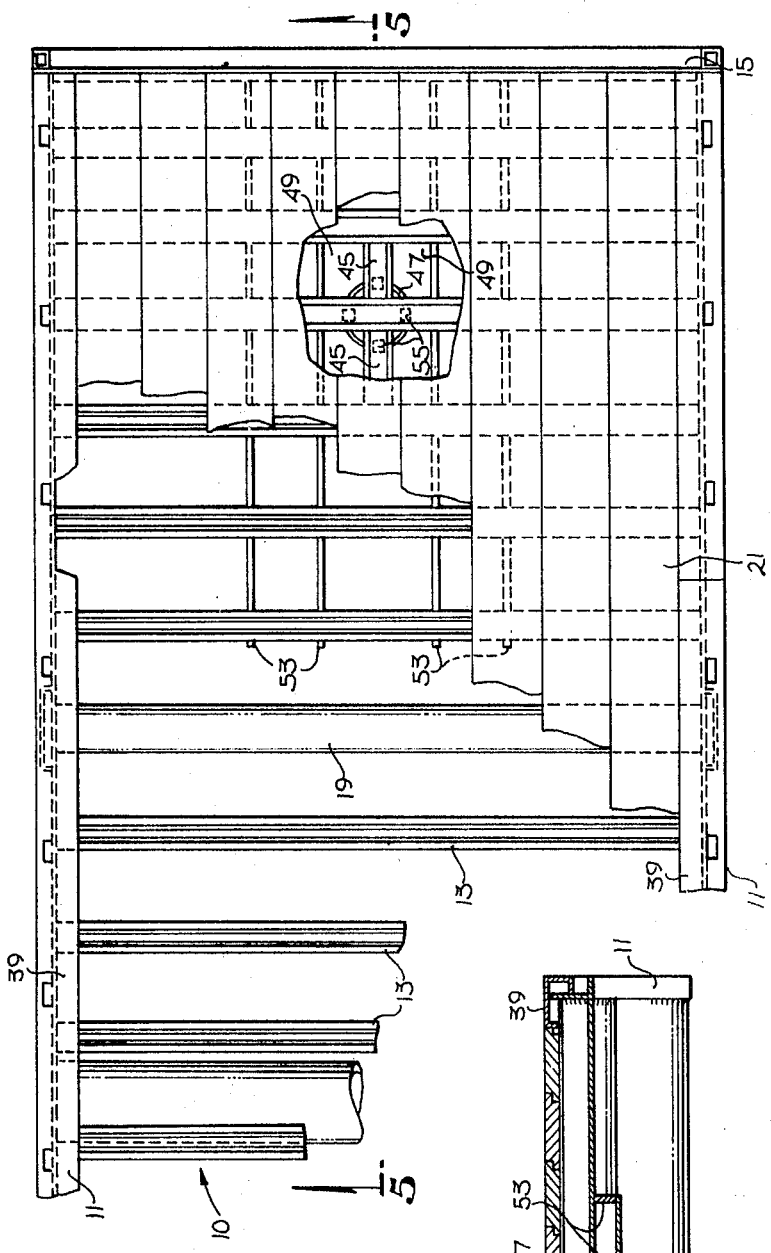
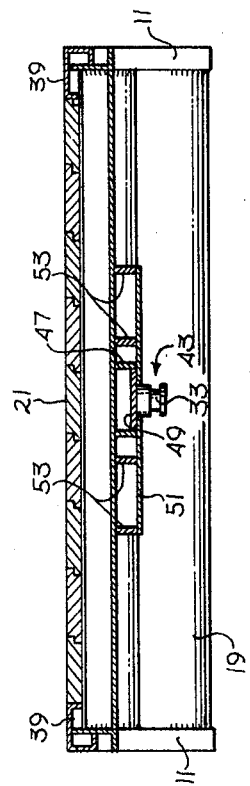
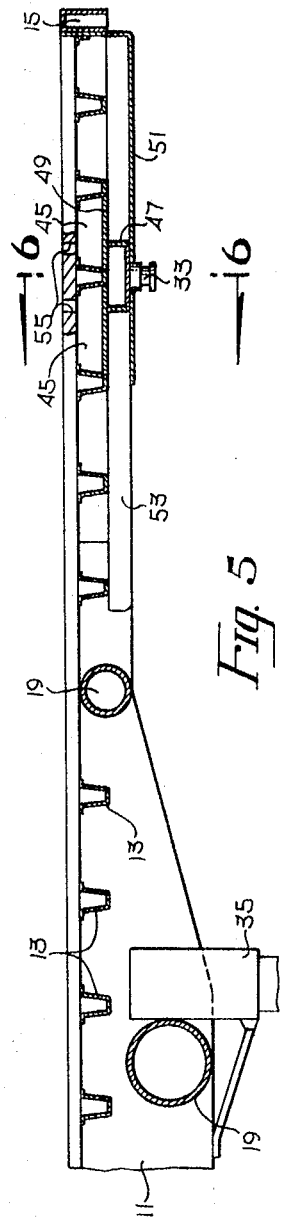
Fig. 4
Fig. 6
Fig. 5
WYLIE A. MASON, JR.
INVENTOR
BY R. E. Geangue
ATTORNEY

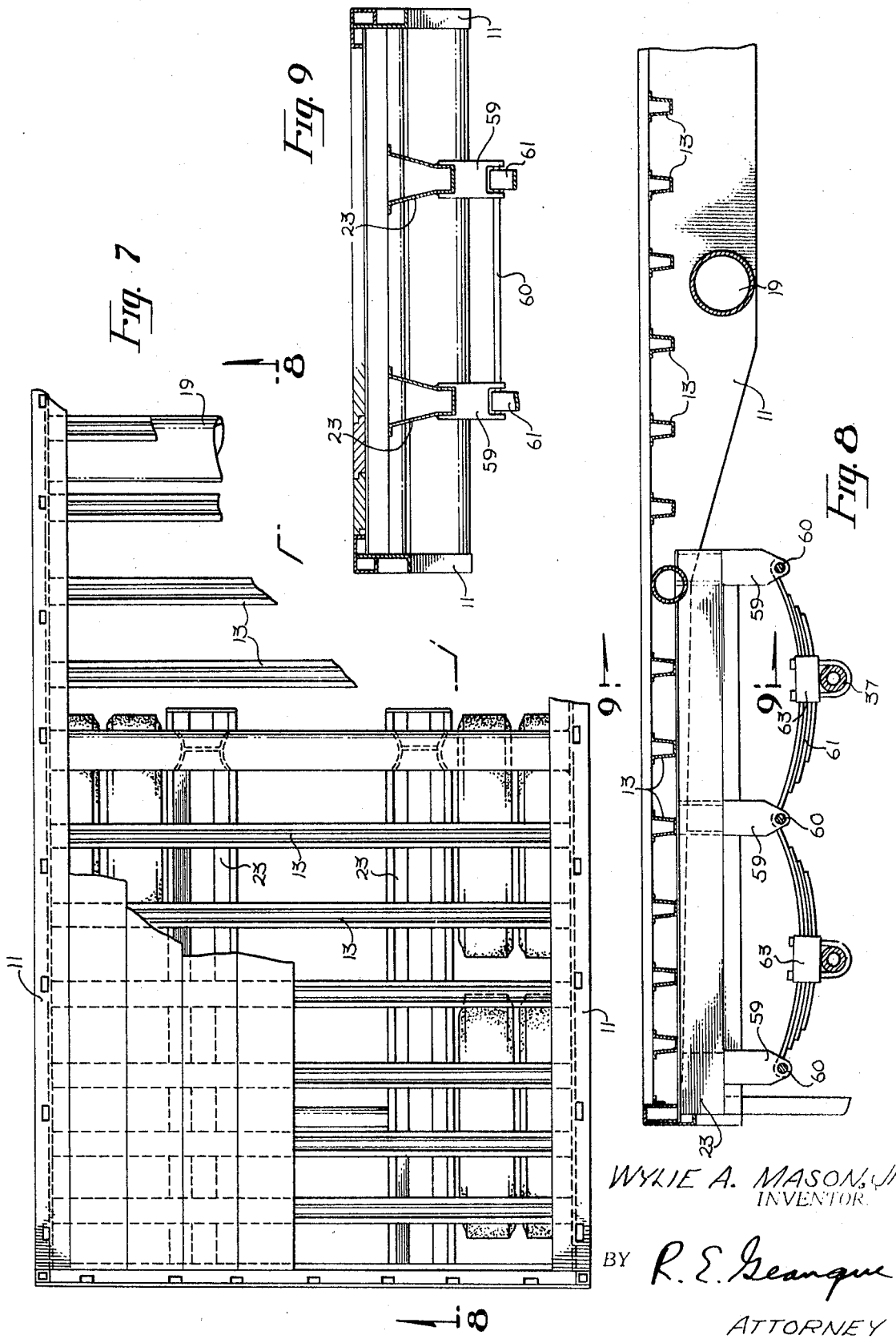

PLATFORM TRAILER

BACKGROUND OF THE INVENTION

1. Field of the Invention

This invention relates to platform trailers and more particularly to a novel platform trailer having means for absorbing the structural loads encountered in its use. 2. Description of the Prior Art In its normal operating mode, a platform trailer is subjected to a multiplicity of inertial loads generated by the various maneuvers performed by the trailer as it is pulled along a roadway, For example, when the rear tires of the trailer simultaneously travel over a bump in the road, such as a railroad track, the elongated side rails of the vehicle are subjected to a vertical bending load. If only one side of the tires hits a bump, the frame of the trailer is twisted in such a manner that the crossbeams and the side rails of the trailer are subjected to a torsional load. Of course, the loads are seldom pure bending or pure torsional, but a combination of the two acting in a variety of modes due to the varied road conditions encountered by the trailer.

Heretofore, platform trailers commonly in use have generally been made of two elongated side rails being joined by a plurality of rigid crossbeams, and a platform fixedly mounted thereon. A difficulty with such a construction is that a very rigid load path is maintained between the hard-point connections on each side of the trailer. This is because the crossbeams are usually of such a rigid construction that they are not capable of absorbing any of the bending and torsional loads that are transferred from one side of the trailer to the other. As a consequence, the parallel hard points of each side of the trailer must absorb these loads and hence are under a tremendous strain. In an extreme condition, these loads put such a strain on the hard points that severe structural damage is caused. Furthermore, such a rigid construction affords an undesirable foundation for the platform, since much of the unabsorbed shock from these loads acting on the support structure is transferred to the platform and to the cargo.

Each of the prior platform trailers normally has a kingpin mounted at its forward end to be inserted into a coupling located on the rearward end of the tractor truck. Generally, the kingpin is connected to a single crossbeam. Consequently, all of the structural loads being transferred through the kingpin are also transferred through the single beam. This results in a very high load concentration on the kingpin support which could cause severe structural damage.

SUMMARY OF THE INVENTION

Accordingly, the problems and difficulties encountered with conventional platform trailers are obviated by the present invention which provides a construction having a high strength-to-weight ratio so that applied loads may be readily absorbed and distributed throughout the construction. Weight of the trailer is markedly reduced and the cargo carried on the platform is greatly protected from undesired shocks and impacts.

In one form of the invention, a platform trailer is provided having a pair of parallel elongated side rails being connected by a plurality of transverse hat-shaped crossbeams and torque tubes with a platform mounted longitudinally on the crossbeams. The torque tubes and hat-shaped crossbeams provide a load path between the identical sets of parallel hard points on each side of the trailer to absorb the bending and torsional loads acting thereon. The platform trailer is further provided with a kingpin carried on one end of the trailer that is supported by a cylindrical member and box construction so as to distribute any inertial loads acting on the kingpin over a wide area.

Therefore, it is among the primary objects of the present invention to provide a platform trailer construction having a high strength-to-weight ratio capable of improved performance and cargo protection.

Another object of the present invention is to provide an elongated flat-bed trailer having a plurality of transverse load-bearing members extending between opposite side rails which are adapted to absorb twisting and bending loads as well as to distribute transmitted loads throughout the entire construction.

Another object of the present invention is to provide a plurality of torque tubes placed at critical locations between opposite side rails of the trailer whereby load distribution and absorption are assured during maneuvering of the trailer over uneven roadways.

Still another object of the present invention is to provide a novel platform trailer of lightweight, high strength construction having kingpin mounting construction adapted to distribute applied loads thereto more evenly to other load-carrying and absorbing members than can be achieved by conventional construction.

BRIEF DESCRIPTION OF THE DRAWINGS

The features of the present invention which are believed to be novel are set forth with particularly in the appended claims. The invention, both as to its organization and manner of operation, together with further objects and advantages thereof, may best be understood by reference to the following description, taken in connection with the accompanying drawings, in which:

FIG. 4 is an enlarged fragmentary view of the top forward end of the trailer exposing portions of the kingpin-mounting construction;

FIG. 5 is a sectional view of the forward end of the trailer taken along lines 5-5 of FIG. 4;

FIG. 6 is a sectional view of the forward end of the trailer shown in FIG. 5 as taken along lines 6-6 thereof;

FIG. 7 is an enlarged view of the rearward end of the trailer;

FIG. 8 is a sectional view of the rearward end of the trailer taken along lines 8-8 of FIG. 7; and FIG. 9 is a sectional view of the rearward end of the trailer taken along lines 9-9 of FIG. 8.

DESCRIPTION OF THE PREFERRED EMBODIMENT

Figure 1:
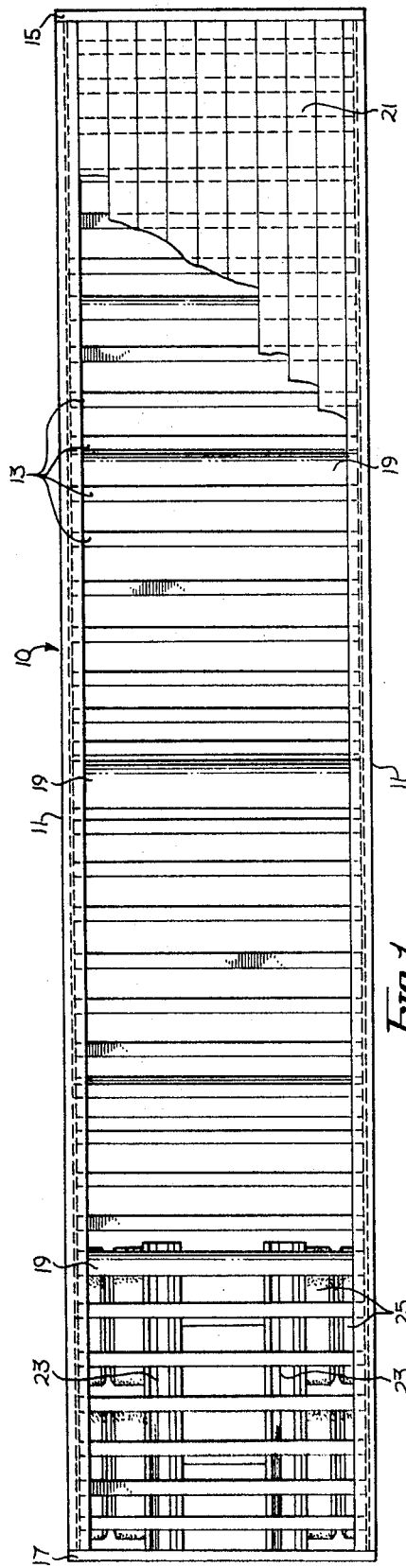
FIG. 1 is a top plan view of a platform trailer with the floor partially broken away to expose the longitudinal side rails and transverse load-absorbing members.

In the illustrated embodiment of the invention, FIG. 1 shows a platform trailer, generally indicated by numeral 10, having a pair of elongated spaced-apart side rails 11 located on opposite sides of the trailer and joined together by a plurality of hat-shaped crossbeams 13, longitudinally spaced for the entire length of the side rails 11. The forward end of the trailer 10 includes a front crossmember 15, while the rearward end includes a rear crossmember 17, both members being suitably connected to the side rails 11. A plurality of torque tubes 19 are also adjoined to the side rails 11 and are spaced in longitudinal intervals the entire length thereof. The forward end of the trailer 10 shows a portion of the decking 21 (partially broken away) mounted on the crossbeams 13 extending between the side rails 11 for the entire length of the trailer. Located at the rear end of the trailer 10 and mounted beneath the cross beams 13 are a pair of suspension beams 23. A plurality of wheels 25 are positioned on both sides of the rearward end of the trailer 10.

Figure 2:
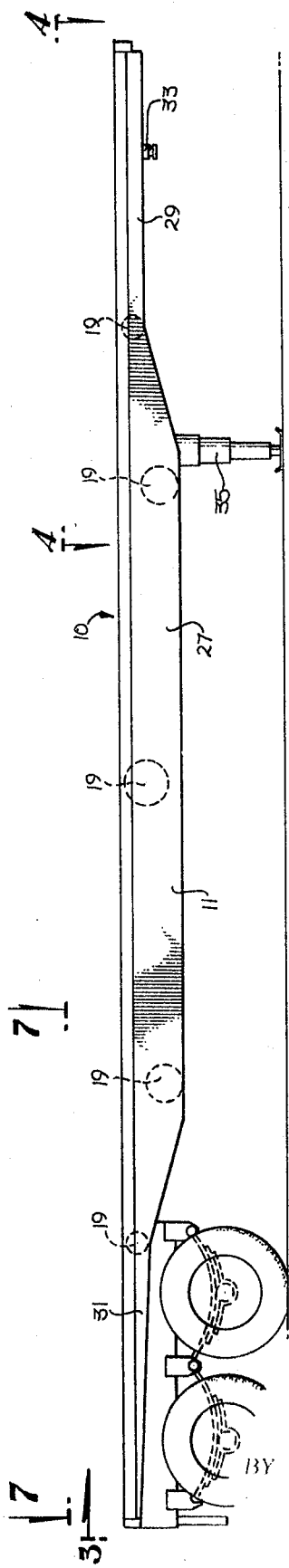
FIG. 2 is a side elevational view of the trailer illustrated in FIG. 1.

As shown in FIG. 2, each of the side rails 11, being identical, includes a central web portion 27, a forward web portion 29 and a rearward web portion 31. The axial position of the torque tubes 19 are shown in broken lines. Extending beneath the forward web portion 29 is a kingpin 33 which is adapted to be inserted in a conventional manner into a coupling located on the rearward end of a tractor truck (not shown). A retractable support gear assembly 35 is connected to the forward end of the central web portion 27 and operates in a conventional manner. The wheel suspension system, located beneath the rearward web portion 29, will be described in greater detail hereinafter.

Figure 3:
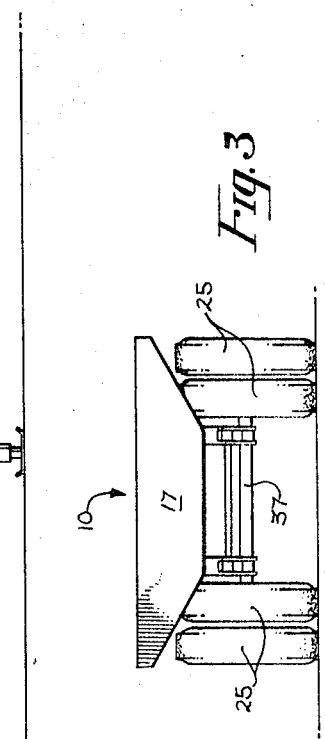
FIG. 3 is an end elevational view of the trailer taken along line 3-3 of FIG. 2.

FIG. 3 shows the rear view of the trailer 10 which includes the rear crossmember 17 and the tire suspension system supporting the wheel axles 37.

As shown in FIGS. 4—6, the side rails 11 are of a box construction, with the top of each rail having an L-shaped projection 39 extending towards the middle of the trailer. The hat-shaped crossbeams 13 are connected to the interior side of the side rails 13 directly below the projections 39. The decking 21 is of an overlap design and is mounted on the crossbeams 13 to fit snugly between the projections 39. The torque tubes 19 are also connected to the interior side of each of the side rails 11 by conventional means such as welding, as are the crossbeams 13. A plurality of stake holes 41 extend through the upper surface of the projections 39 and are longitudinally spaced their entire length thereof.

Located beneath the forward portion of the crossbeams 13 is the kingpin assembly, generally indicated by the arrow 43. The kingpin assembly 43 includes a pair of axial tie members 45 located between and connected to the sides of three of the crossbeams 13. The cross section of the tie members 45 is identical to the cross section of the crossbeams 13. A closed annular ring 47 is located beneath the intersection of the tie members 45 with the crossbeam 13, with its open end being integrally connected at four points thereto, by any conventional means such as welding. The closed end of the annular ring 47 forms a mounting plate 49 which supports the kingpin 33. A rectangular plate 51, located directly below the mounting plate 49, has an aperture to receive the kingpin 33, and is also integrally connected thereto. Four axial bars 53 are connected at their upper sides to the crossbeams 13 with a portion of each bar being connected to the rectangular plate 51 to act as a support therefor. Four stake holes 55 are located directly above the annular ring 47 and extend through the decking 21.

FIGS. 7—9 show the rear tire suspension system which includes a pair of suspension beams 23 connected to the rearward group of crossbeams 13. Three spring mounts 59 are fixedly attached to each suspension beam 23. A tie bar 60 is connected each pair of parallel spring mounts 59 to support four leaf spring assemblies 61 at their ends. A yoke member 63 is located at the middle of each spring assembly 61 to rotatably support an axle 37. A pair of tires 25 are mounted on each end of the axles 37.

It is noted that each of the hat-shaped crossbeams 13 is of a flexible construction as is the torque tube construction. That is to say, that the crossbeams 13 and torque tubes 19 are of ample strength to provide a rigid load path between the parallel hard point connections of the side rails 11, while still being sufficiently flexible to absorb a great portion of the bending and torsional loads transferred through the support structure. In this manner, the strain put on the hard point connections of the crossbeams 13 and torque tubes 19 with the side rails 11 are minimized thereby insuring structural integrity under all load conditions. Furthermore, since the suspension beams 23 are directly connected to the crossbeams 13, the crossbeams 13 will further dampen the load being transferred through the structure from the suspension system, and act as an auxiliary shock absorber for the trailer.

It is also noted that since the kingpin 33 is supported by both plates 49 and 51, the inertial loads encountered by the kingpin 33 is distributed over the entire area covered by the bars 53 and the axial ties 45, thereby minimizing the structural overloading of the kingpin assembly.

It will be understood that various changes in the details, materials, steps and arrangements of parts, which have been herein described and illustrated in order to explain the nature of the invention, may be made by those skilled in the art within the principle and scope of the invention as expressed in the appended claims.

What I claim is:

1. A platform trailer comprising:
a pair of parallel elongated side rails;
a plurality of flexible cross beams longitudinally spaced between said side rails the entire length thereof and being connected at their ends to said side rails, said crossbeams being of U-shaped configuration with the legs of said crossbeams being secured to said side rails;
a plurality of torque tubes longitudinally spaced at intervals between said side rails and also being connected at their ends to said side rails, selected ones of said torque tubes being of larger diameter than other ones of said tubes;
a wheel assembly attached at the rearward end of said side rails to a portion of said crossbeams; and
a kingpin assembly connected at the forward end of said side rails to another portion of said crossbeams.

2. A platform trailer comprising:
a pair of parallel elongated side rails;
a plurality of flexible crossbeams longitudinally spaced between said side rails the entire length thereof and being connected at their ends to said side rails;
a plurality of torque tubes longitudinally spaced at intervals between said side rails and also being connected at their ends to said side rails;
a wheel assembly attached at the rearward end of said side rails to a portion of said crossbeams;
a kingpin assembly connected at the forward end of said side rails to another portion of said crossbeams;
a plurality of axial bars connected to said other portion of said crossbeams;
a rectangular plate connected to said axial bars having an aperture;
an annular ring connected to a crossbeam having a closed end; and
a kingpin connected to said closed end and extending through said aperture, whereby any inertial load encountered by said kingpin is distributed by said rectangular plate to said plurality of axial bars.

3. In a platform trailer having elongated spaced-apart side rails extending longitudinally in parallel relationship and having a wheel assembly resiliently supporting one end of said side rails, the combination comprising:
a plurality of beam members arranged in fixed spaced parallel relationship perpendicular to and between said sidewalls and each of said beam members having its opposite ends secured to each of said side rails;
each of said beam members being further characterized by being of substantially U-shaped in cross section;
at least one torque tube disposed between said side rails and having its opposite ends secured thereto; and
said beam members and said torque tube being connected to said side rails in load-transferring-and-absorbing relationship.

4. The invention as defined in claim 3 wherein a plurality of torque tubes are interconnected between said side rails and selected ones of said tubes are of larger diameter than other ones of said tubes.

5. The invention as defined in claim 4 wherein each of said beam members are semirigid, hat-sections adapted to carry bending and torsion loads.

6. The invention as defined in claim 3 including:
an annular mounting member carried on one end of said trailer;
a flat plate carried on the underside of said mounting member; and
a kingpin fixedly secured to said flat plate whereby loads incurred by said kingpin are distributed to said side rails via said mounting member.